April 23, 1940.  J. LAUTERBACH  2,198,543
ROTARY VALVE MECHANISM
Original Filed Aug. 18, 1936  2 Sheets-Sheet 1

Inventor:-
John Lauterbach
by his Attorneys
Howson & Howson

April 23, 1940. J. LAUTERBACH 2,198,543
ROTARY VALVE MECHANISM
Original Filed Aug. 18, 1936   2 Sheets-Sheet 2
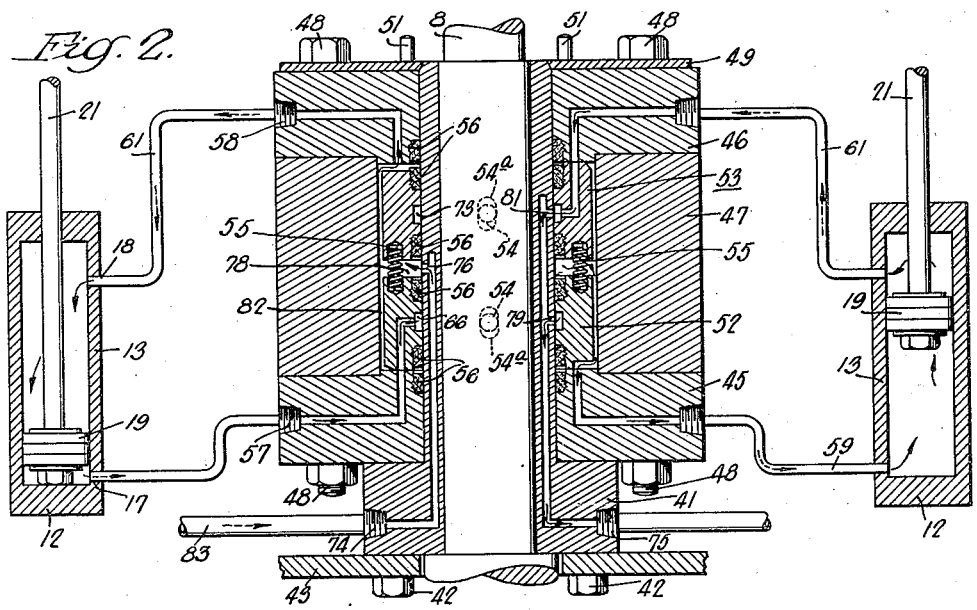
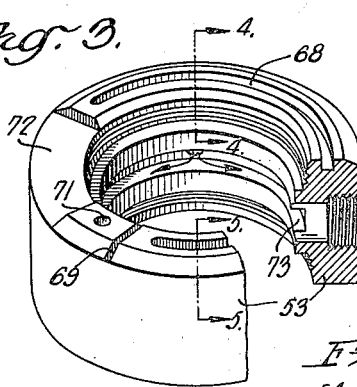
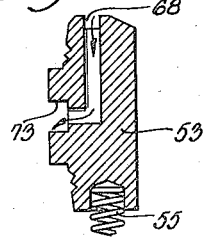
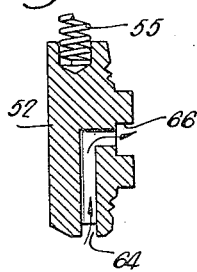
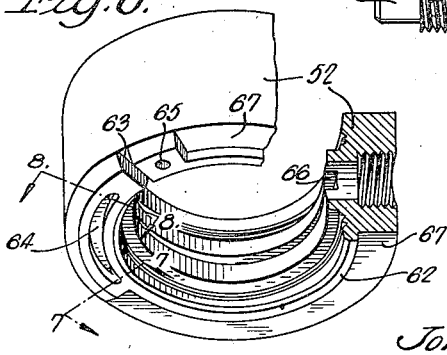
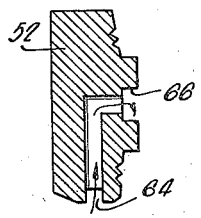
Inventor:-
John Lauterbach
by his Attorneys
Howson & Howson Patented Apr. 23, 1940

2,198,543

UNITED STATES PATENT OFFICE 2,198,543

ROTARY VALVE MECHANISM

John Lauterbach, Philadelphia, Pa., assignor to Lauterbach Corporation, a corporation of Delaware Original application August 18, 1936, Serial No. 96,661, now Patent No. 2,155,316, dated April 18, 1939. Divided and this application October 3, 1938, Serial No. 233,096

8 Claims. (Cl. 137—146)

This application is a division of my copending application Serial Number 96,661, and now Patent No. 2,155,316, granted April 18, 1939, pertaining to a rotary molding machine wherein the plurality of mobile dies are actuated in part by individual fluid motors, and the invention herein described and claimed has to do particularly with the novel valve mechanism for controlling and regulating the connection of said motors with the source of fluid energy.

In the attached drawings:

Fig. 2 is an enlarged vertical sectional view through the valve unit;

Fig. 3 is a detached view in perspective of one of the valve elements;

Figure 1:
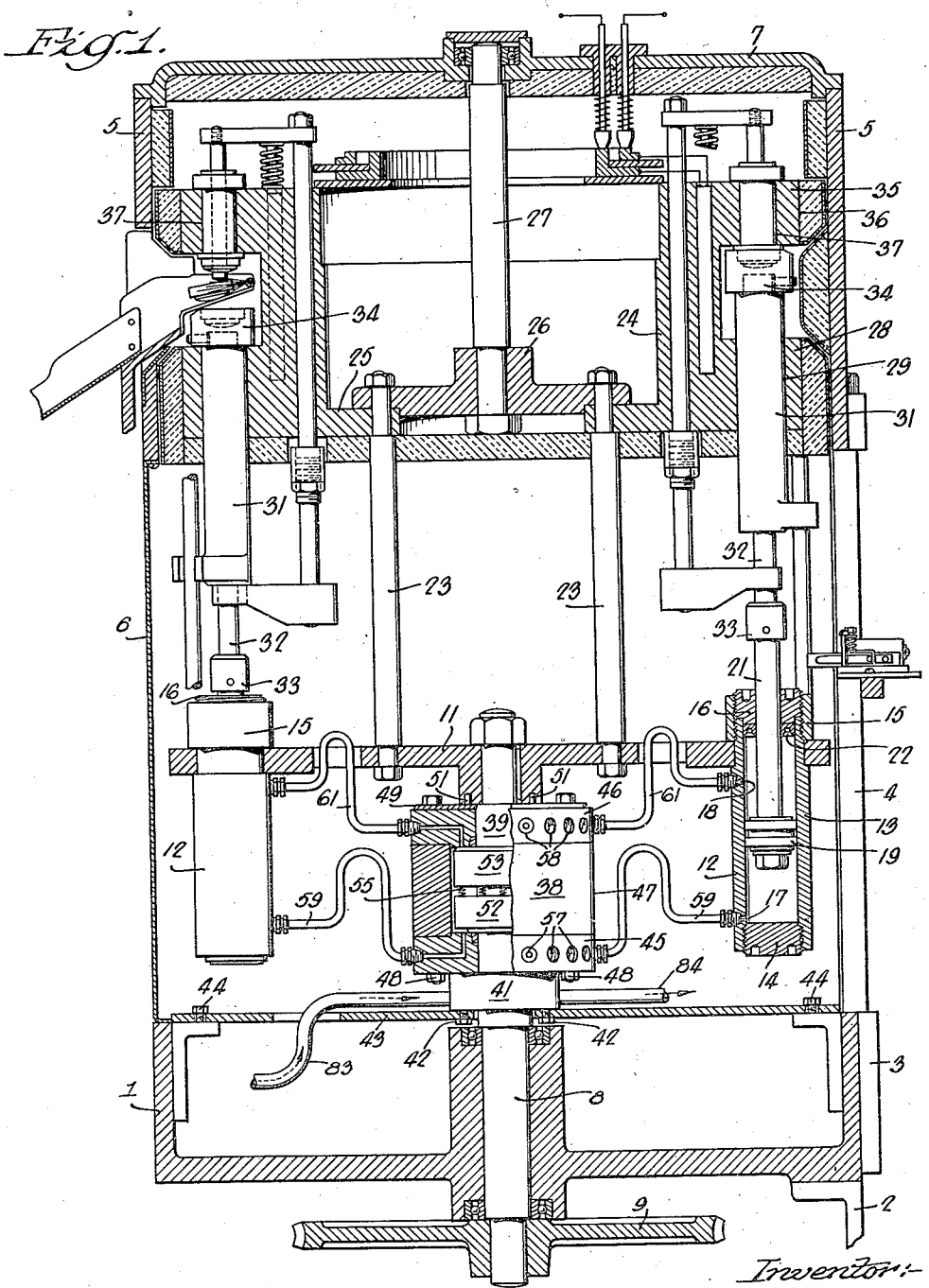
Figure 1 is a vertical sectional view of the molding machine showing the valve unit.

Figs. 4 and 5 are, respectively, sectional views on the lines 4—4 and 5—5, Fig. 3;

Fig. 6 is a detached view in perspective of another of the elements of the valve;

Figs. 7 and 8 are sectional views taken on the lines 7—7 and 8—8, respectively, of Fig. 6, and Fig. 9 is a detached view of still another element of the valve structure.

With reference to Fig. 1 of the drawings, the embodiment of the molding machine therein illustrated comprises a base member 1 supported upon legs 2. The base member 1 has at its periphery bosses 3 in which are secured vertical tie rods 4 which constitute a support for an upper housing 5. Between the base 1 and the housing 5 is a casing 6 which partially embraces the intervening space and which with the housing 5 forms a chamber for the moving parts of the mechanism. As illustrated, the housing 5 comprises a cover plate 7.

Journaled in the central part of the base 1 is a vertical shaft 8 which carries at its lower end a worm wheel 9. To the upper end of this shaft is secured a flange 11 which carries in the peripheral portion thereof an annular series of hydraulic cylinders 12. As shown in Fig. 1, each of these cylinders comprises a main cylindrical section 13 which is closed at the bottom by a threaded plug 14 and which is supported in the flange 11 by means of a threaded sleeve 15, this sleeve also receiving a threaded plug 16 which closes the upper end of the cylinder. Each of these cylinders is provided at the lower end with a port 17 and toward the upper end with a port 18, for admission and discharge of an actuating fluid respectively. In each of the cylinders is a hydraulic piston 19 having a piston rod 21 which extends upwardly through the plug 16, and the usual cup packing 22 is provided at the inner end of the plug 16 to prevent escape of fluid past the piston rod.

Supported on the flange 11 by means of tie rods 23 is a rotary head or drum 24, said head having at its lower end an inwardly projecting flange 25 through which the said tie rods extend. The flange 25 constitutes a support for a member 26 which is secured to the flange 25 by the tie rods 23 and which constitutes a support for a shaft section 27 which extends upwardly through the head 24 and is journaled at its upper end in anti-friction bearings in the cover plate 7 of the housing 5. The head 24 also comprises a radial flange 28 having a series of vertical bores 29 corresponding in number and in vertical alignment with the cylinders 12, and in each of these bores is slidably supported a cylindrical member 31 having at its lower end an extension 32 of reduced diameter which is joined by means of a suitable sleeve coupling 33 with the piston rod 21 of the aligned hydraulic cylinder 12. Detachably mounted at the upper end of each of the members 31 is a die element 34. The head 24 also has at its upper end an outwardly projecting radial flange 35 having a circumferential series of cylindrical openings 36 aligned respectively with the bores 29 of the underlying flange 28, and each of the openings 36 carries a die element 37 designed to cooperate with the aligned die element 34 supported as previously described upon the members 31.

Embracing the shaft 8 immediately below the flange 11 is a master valve unit designated generally by the reference numeral 38. As shown in Figs. 1 and 2, this valve unit comprises a central sleeve 39 which embraces the shaft 8 and which through its lower enlarged portion 41 is secured by means of stud bolts 42 to a plate 43, this plate in turn being secured by bolts 44 to the base 1. The bolts 44 pass through concentric arcuate slots in the plate 43, which provides for adjustment in a circumferential direction of the sleeve 39 upon the shaft 8. Embracing the sleeve 39 is a housing consisting of a lower section 45, which is supported upon the lower extended end 41 of the sleeve and which closely embraces the latter; a corresponding upper section 46; and an intermediate section 47, these three sections being secured together by bolts 48. Secured against the upper surface of the upper section 46 of this housing is a plate 49 having upwardly projecting pins 51, which pins as shown in Fig. 1 enter recesses in the sub-portion of the flange 11 and thereby immobilize the housing 45—46—47 with respect to this flange. Within the space between the intermediate section 47 of the valve housing and the sleeve 39 is a pair of annular valve elements 52 and 53, each of these elements closely embracing the sleeve 39 and being keyed thereto, as indicated at 54 in Fig. 2. The element 52 rests upon the housing element 45, and by means of springs 55 interposed between the elements 52 and 53, the latter element is forced upwardly into engagement with the under side of the housing element 46. Suitable packing is provided as indicated at 56 to prevent leakage of fluid between the sleeve 39, the housing members 45 and 46 and the valve elements 52 and 53.

It will be apparent from the foregoing description that the sleeve 39 being secured to the base 1 through the medium of the plate 43 remains stationary, as also do the valve elements 52 and 53 which are secured by the keys 54 to the sleeve, these keys being in the form of pins (see Fig. 9) which are threaded into the elements 52 and 53 and project into slots 54a in the sleeve 39. The housing 45—46—47, however, is secured to the flange 11, and through the flange 11 with the shaft 8 with which, therefore, the housing rotates. It will be apparent also that the head 24, the die elements supported therein, the pressure cylinders 12 and the housing elements of the master valve 38 rotate with the shaft 8 as a unit.

In the outer faces of each of the valve housing elements 45 and 46 is a series of ports, 57 and 58 respectively, the ports of each series corresponding in number with the cylinders 12. The ports 57 of the housing element 45 are respectively connected through pipes 59 to the ports 17 of the cylinders 12; and the ports 58 of the housing element 46 are similarly connected through pipes 61 with the cylinder ports 18. Each of the ports 57 extends inwardly of the element 45 in the radial direction and upwardly to the surface contacted by the valve element 52. Each of the ports 58 extends radially inwardly in the housing element 46 and downwardly to the surface of that element contacted by the valve element 53. The lower end surface of the valve element 52, as shown in Fig. 6, is provided with a flange 62 which extends continuously around the inner periphery of the valve element with the exception of a narrow radial slot indicated by the reference numeral 63. At each side of this slot the flange 62 is widened toward the outer periphery of the valve element, and these widened sections are provided respectively with an elongated port 64 and a circular port 65. The arrangement is such that as the valve housing 45—46—47 rotates, the ports 57 are brought consecutively and successively into communication with the port 64, the slot 63, the port 65, and the recessed space 67 between the flange 62 and the outer periphery of the valve element. The port 64 extends upwardly through the body of the valve element 52, see Fig. 7, and communicates at its inner end with an annular recess 66 formed in the inner surface of the valve element 52. The port 65 is similarly connected at its inner end with the recess 66.

The upper end surface of the valve element 53, as shown in Fig. 3, which bears against the valve housing element 46 as previously described, is provided with an elongated port 68, a transverse slot 69, a port 71, and a recess 72, with which as the valve housing rotates the ports 58 of the housing element 46 are brought consecutively and successively into communication. As shown in Fig. 4, the port 68 communicates with an annular recess 73 in the inner surface of the valve element 53, and the port 71 similarly communicates with this recess. The port 68 has a circumferential extent corresponding with the circumferential extent of the recess 67 of the valve element 52. The recess 72 of the valve element 53 corresponds in length with the port 64 of the valve element 52, and the valve elements 52 and 53 are so relatively arranged, as shown in Figs. 3 and 6, that when one of the ports 58 is in communication with the recess 72 of the element 53, the interrelated port 57 is in communication with the port 64. A similar positional relation exists between the port 68 of the element 53 and the recess 67 of the element 52, and between the slot 69 and port 71 of the element 53 and the port 65 and slot 63 of the element 52, respectively. It will be apparent, therefore, that when any one of the ports 57 is in communication with the port 64 of the valve element 52, its companion port 58, i. e., that one of the ports 58 which is connected to the same pressure cylinder 13, is in communication with the recess 72 of the valve element 53. Similarly when any one of the ports 57 is in communication with the slot 63 of the valve element 52, its companion port 58 will be in communication with the port 71 of the valve element 53. When any one of the ports 57 is in communication with the port 65 of the valve element 52, its companion port 58 will be in communication with the slot 69 of the valve element 53; and when any one of the ports 57 is in communication with the recess 67 of the valve element 52, its companion port 58 will communicate with the port 68 of the valve element 53.

As illustrated in Fig. 2, the sleeve 39 is provided with a pair of ports 74 and 75 which extend inwardly from opposite sides of the lower end of the sleeve respectively. The port 74 extends upwardly through the sleeve and communicates at 76 with the space 78 between the valve elements 52 and 53. The port 75 also extends upwardly through the sleeve 39 and communicates at 79 and 81 respectively with the annular recesses 66 and 73 of the valve elements 52 and 53. Thus the port 74 is in continuous communication with the space 78 between the valve elements 52 and 53, and the port 75 is in continuous communication with the annular recesses 66 and 73 of the said valve elements. Also as shown in Fig. 2, the valve elements 52 and 53 are of lesser diameter than the interior diameter of the housing member 47 so that an annular space 82 is formed between the valve elements and the housing member which communicates with the space 78 between the valve elements and also with the recesses 67 and 72 of the valve elements 52 and 53 and with the slots 63 and 69 of these elements. When, therefore, any one of the ports 57 is in communication with the slot 63 or recess 67 of the valve element 52, that port 57 is also necessarily in communication with the space 78 between the valve elements 52 and 53 and with the port 74. Similarly when any one of the ports 58 is in communication with the slot 69 or recess 72 of the valve element 53, that port is also necessarily connected with the space 78 and with the port 74. Since the port 74 is connected through a pipe 83 with a source of fluid pressure (not shown), it will be apparent that when any one of the ports 57 communicates with the slot 63 or recess 67 of the valve element 52, fluid pressure will be admitted to the lower end of the pressure cylinder connected with that port; and when any one of the ports 58 communicates with the slot 69 or recess 72 of the valve element 53, fluid pressure will be admitted to the upper end of that one of the cylinders connected to that port. Since, as previously set forth, when any one of the ports 57 is connected with the slot 63 or recess 67 of the valve element 52, its companion port 58 is in communication with the port 71 or port 68 of the valve element 53, it will be apparent that when pressure is admitted to the lower end of any one of the cylinders 13, the upper end of that cylinder will be connected with the port 75, which through a pipe 84 is connected with the exhaust. Under these circumstances, therefore, the fluid pressure entering the lower end of the cylinder 13 will force the contained piston 19 upwardly, carrying with it the associated die element 34. When on the other hand any one of the ports 58 is connected with the slot 69 or recess 72 of the valve element 53, the reverse connection between the pressure and exhaust ports and the cylinder ports 57 and 58 will have been made, with the result that fluid pressure then admitted to the upper end of the cylinder will force the piston 19 downwardly to the normal depressed position, carrying with it to the normal depressed position the associated die element 34. In one complete revolution of the machine, therefore, the port 57 of each of the cylinders 13, starting for example in communication with the port 64 of the valve element 52, at which time the piston will be in the depressed position, will move successively into contact with the slot 63, the port 65 and the recess 67. When the port communicates with the slot 63, pressure is admitted as previously described to the bottom of the cylinder so that the piston is forced upwardly. This movement of the piston, depending on the speed of rotation and the width of the slot 63, may elevate the associated die element 34 to the maximum extent completely closing the die, or to a lesser extent partially closing the die. Assuming that the closing of the die is completed when the port 57 communicates with the slot 63, it will be apparent that when the port 57 moves into contact with the port 65 of the valve element 52, there will be a momentary separation of the die parts, or, in the event that the die is not completely closed, at least a momentary interruption in the upward movement, permitting the gases to escape from the die and thereby avoiding defects in the molded product arising from a trapping of the gases in the die that otherwise might occur. Subsequently when the port 57 moves into communication with the recess 67 of the die element 52, the die elements will be completely closed, and will remain closed with the pressure applied in the bottom of the associated cylinder 13 during the remaining portion of the rotational movement and until the port 57 again is brought into communication with the port 64, at which time the piston 19 will be forced downwardly in the cylinder and will open the die. Preferably the ports are so relatively arranged that the power strokes which respectively close and open the dies and which occur at opposite sides of the machine will not be simultaneously initiated.

The timing of the die actuation with regard to the cyclic movement may be regulated by adjustment of the plate 43 about the axis of the shaft 8, for which adjustment provision is made as previously set forth in the slotted openings for the bolts 44. It will be apparent that adjustment of the plate 43 as described will also effect an angular adjustment of the relatively fixed elements of the master valve 38 comprising the sleeve 39 and the valve elements 52 and 53.

I claim:

1. A rotary valve mechanism comprising non-rotating members including a sleeve member having an inlet port and an outlet port and separate conduits through said member from said ports, two collars on said sleeve spaced apart and each having in the relatively remote end face thereof a pair of spaced arcuate ports of similar radius, one port of each collar having constant connection with the inlet conduit of said sleeve and the other port of each collar having separate constant connection with the outlet conduit of the sleeve, and cooperating rotary valve members enclosing said collars and comprising two spaced distributor rings associated respectively with the collars and each having a face engaging the ported end face of the associated collar, and a tubular member connecting said rings and spaced from the said collars, each distributor ring having a circumferential series of passages extending from an exterior face of the ring to its collar-engaging face for registration with the ports of said collar face, each passage of one ring forming with a corresponding passage of the other ring a pair arranged for simultaneous connection by way of said collar ports with the said inlet and outlet ports respectively of said sleeve.

2. A rotary valve mechanism comprising non-rotating members including a sleeve member having inlet and outlet ports and separate conduits extending through said member from the ports, two collars on said sleeve spaced apart and each having in the relatively remote end face thereof a pair of spaced arcuate ports of similar radius, one port of each collar having constant connection with the inlet conduit of said sleeve and the other port of each collar having separate constant connection with the outlet conduit of the sleeve, and cooperating rotary valve members enclosing said collars and comprising two spaced distributor rings associated respectively with the collars and each having an annular face engaging the ported end face of the associated collar, and a tubular member connecting said rings and spaced from said collars, each distributor ring having a circumferential series of passages extending from an exterior face of the ring to its collar-engaging face for registration with the ports of said collar face, each passage of one of said rings forming with a passage of the other ring an associated pair arranged for simultaneous connection by way of said collar ports with the said inlet and outlet ports respectively of said sleeve.

3. A rotary valve mechanism comprising non-rotating members including a sleeve member having an inlet port and an outlet port and separate conduits extending through said member from said ports, two collars on said sleeve spaced apart and each having in the relatively remote end face thereof a set of even numbered spaced ports in different parts of the same circle, the alternate ports of each collar having constant connection respectively with the inlet conduit and outlet conduit of the sleeve, and cooperating rotary valve members enclosing said collars and comprising two spaced distributor rings associated respectively with the collars and each having a face engaging the ported end face of the associated collar, and a tubular member connecting said rings and spaced from said collars, each distributor ring having a circumferential series of passages extending from an exterior face of the ring to its collar-engaging face for registration with the ports of said collar face, each passage of one distributor ring forming with a corresponding passage of the other ring an associated pair arranged for simultaneous connection by way of said collar ports with the said inlet and outlet ports respectively of said sleeve.

4. A rotary distributing valve mechanism comprising a relatively fixed sleeve having inlet and outlet fluid pressure ports, a collar fixed to said sleeve and having ports communicating respectively with said inlet and outlet ports of the sleeve, and a rotary member fitted to said sleeve and embracing the collar and having a plurality of pairs of ports for registration with the ports of said collar, the ports of each pair being arranged so as to communicate simultaneously and respectively with the said inlet and outlet ports and alternately with each of said inlet and outlet ports as the said member rotates.

5. A rotary distributing valve mechanism comprising a relatively fixed sleeve having inlet and outlet fluid pressure ports, a pair of spaced collars keyed to said sleeve for limited axial movements, said collars having ports intermediate the ends and in the inner sleeve-abutting surfaces for communication with one of said sleeve ports and having other ports in the relatively remote ends connected to said intermediate ports, a rotary member fitted to said sleeve and embracing said collars and spaced from the outer side surfaces of the latter, said collars having independent ports in said relatively remote ends connected through said last-mentioned space with the space between the proximate ends of the collars, means for establishing communication between the other of said sleeve ports and the space between said collars, ports in said rotary member arranged for registration with the said ports in the relatively remote ends of said sleeves, resilient means exerting pressure to force said sleeves apart and into engagement with the ported areas of said rotary member, and packing means sealing the joints between said sleeve and the said collars and rotary member respectively.

6. A rotary valve mechanism comprising a relatively fixed sleeve, a rotary shaft extending through said sleeve, a pair of spaced collars fixed to said sleeve and each having in the remote end face a pair of separate arcuate ports concentric with the shaft axis, one port of each pair being connected with the space between said collars and the other port of each pair being connected with a passage in the associated collar terminating in the inner face of the latter abutting said sleeve, an inlet passage in said sleeve communicating with the said space between the collars, an outlet passage in said sleeve communicating with the said collar passages, a rotary valve member embracing said sleeve and collars and connected with said shaft and having two corresponding circumferential series of passages, the ports of one series being arranged for registration with the arcuate ports of one collar, and the ports of the other series being arranged for registration with the arcuate ports of the other collar, and said arcuate ports being so relatively arranged in the collars that when any of the passages of one series registers with the inlet port of one collar, a corresponding passage of the other series registers with the outlet port of the other collar.

7. A rotary valve mechanism comprising a relatively fixed sleeve having inlet and outlet fluid pressure ports, a hollow rotary member fitted to said sleeve and having a plurality of ports arranged in pairs for connection respectively and interchangeably with said inlet and outlet ports, means in the interior of said rotary member for establishing said connections, said means comprising a pair of relatively spaced collars keyed to said sleeve for limited axial movements on the latter and having ports in the relatively remote ends thereof for registration with the ports of said member, and resilient means between said collars exerting pressure on the latter to maintain the ported end surfaces of said collars in contact with the opposed ported surfaces of said rotary member.

8. A rotary distributing valve mechanism comprising a relatively fixed sleeve having inlet and outlet fluid pressure ports, a collar fixed to said sleeve and having ports communicating respectively with said inlet and outlet ports of the sleeve, a rotary member fitted to said sleeve and embracing the collar and having a plurality of pairs of ports for registration with the ports of said collar, the ports of each pair being arranged so as to communicate simultaneously and respectively with the said inlet and outlet ports and alternately with each of said inlet and outlet ports as the said member rotates and means for adjustment of said sleeve and collar about the axis of said rotary member.

JOHN LAUTERBACH.